Figure 1:
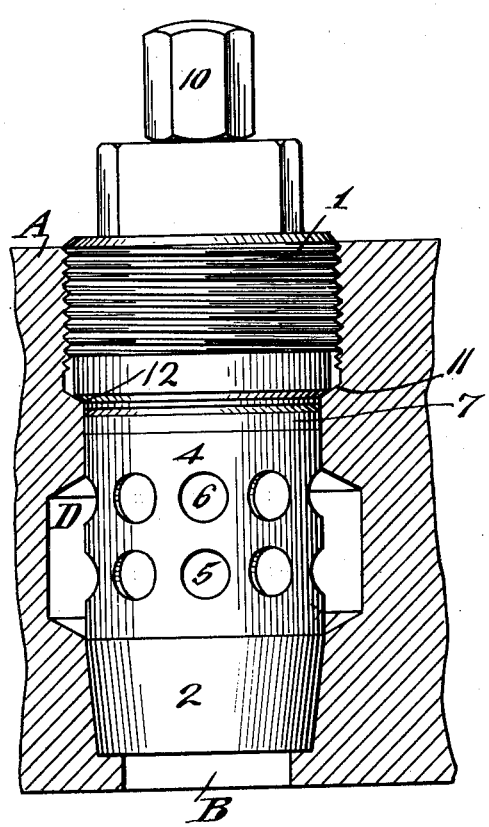

Sept. 20, 1927.

W. M. FLEMING

VALVE

Filed April 12, 1924

1,642,724

Inventor
Willa M. Fleming
By his Attorneys

Patented Sept. 20, 1927.

1,642,724

UNITED STATES PATENT OFFICE.

WILLS M. FLEMING, OF HOLYOKE, MASSACHUSETTS, ASSIGNOR TO WORTHINGTON PUMP & MACHINERY CORPORATION, OF NEW YORK, N. Y., A CORPORATION OF VIRGINIA.

VALVE.

Application filed April 12, 1924. Serial No. 706,091.

This invention relates to valves for pumps or the like and especially to high pressure pump valves operating under conditions which cause rapid wear of the valve and its seat, necessitating adjustment to prevent excessive valve lift and frequent refacing or replacement of the valves and their seats, as in oil line pumping.

The especial object of the invention is to provide a cheap, efficient and easily assembled valve especially adapted to meet these conditions.

A further object of the invention is the provision of a construction in which the valve parts, while easily and quickly removable, are positively held in position to prevent dislocation, the relationship of the various valve parts is not affected by the refacing of the valve seat in compensating for wear thereof, and all gasket joints are eliminated.

For a full understanding of the invention, there is shown in the accompanying drawing, forming a part of this specification, a preferred embodiment of the invention and this construction will now be described in detail and the features forming the invention then specifically pointed out in the claims.

In the drawing,—

Figure 2:
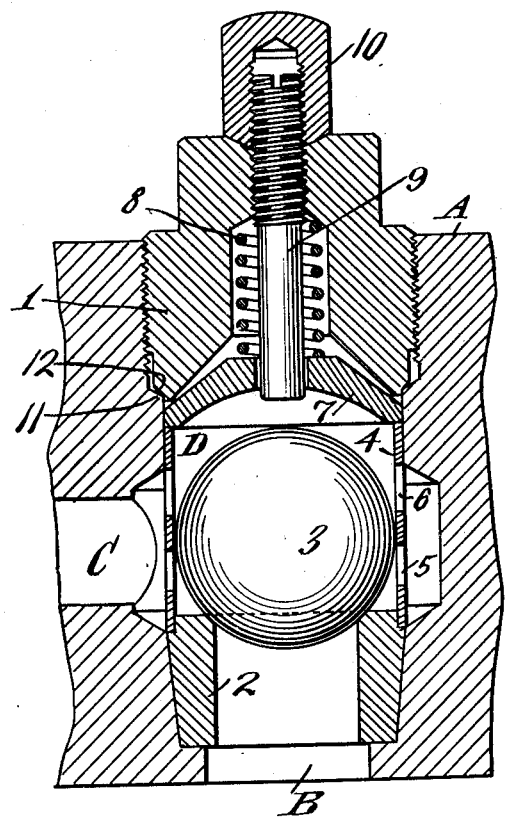
Figure 3:
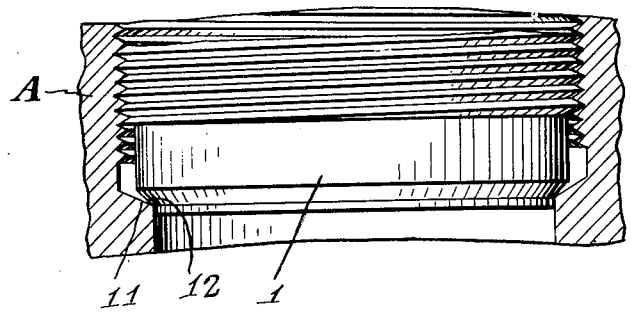

Figure 1 is a side elevation partly in section of a valve formed in accordance with my invention, Figure 2 is a central vertical section thereof, and Fig. 3 is an enlarged view of the joint between the valve chest and the valve plug closure.

Referring to the drawing, the valve chest A, which forms a portion of the usual forged steel billet used for this purpose in high pressure pumping, is provided with the customary passages B and C connected by a suitable bore forming a valve chamber D, the outer end of the bore being closed by a valve plug 1. In the present embodiment, the invention is shown as applied to a suction valve and therefore the passages B and C connect respectively with a suitable source of supply and the interior of the pump (not shown).

The passage B is provided with a tapered recess, into which a valve seat 2 is driven, the taper of the recess being preferably steep so that the seat 2 may be readily removable for replacement and refacing. A valve, which may be of any suitable type, but preferably a ball valve 3, co-acts with seat 2 for the control of passages B and C and is guided in its movement by a valve cage 4 which bears against the upper face of the valve seat 2, preferably within an annular recess formed in the outer periphery of the valve seat.

The valve chamber D and passage C are connected through the valve cage 4 by suitable ports therein, which are preferably arranged in two-spaced annular rows 5 and 6 in symmetrical relation to the ends of the valve cage 4, so that either end of the valve cage may be inserted first, thus obviating all necessity for care in the replacement thereof. The lower row of ports 5 permits the fluid passing through the valve seat 2 to pass out uniformly in all directions into the passage C, and the upper row of ports 6 prevent any dash pot action not only during the opening movement of the ball valve 3, but also when the ball valve is at the uppermost limit of its travel. A cover 7 closes the upper end of the valve cage 4 and is held in position by a substantial spring 8 housed within a suitable bore in the valve plug 1.

The valve cage 4 not only functions to accurately guide the ball valve 3 in its opening and closing movements so that it invariably seats squarely unaffected by the lateral wash of the fluid flowing through the valve seat 2 and the ports 5, but also, in combination with the cover 7 and spring 8, to positively retain the parts in proper position and prevent any possibility of the valve seat 2 working loose during the operation of the pump.

The travel of the valve is adjustable from outside the valve chest so that the lift of the valve may be maintained constantly at that point which will give the best valve efficiently, irrespective of the wear of the valve and its seat, without the necessity of stopping the pump or removing the valve plug. For this purpose I provide an adjustable stop 9, which is screw threaded through the valve plug 1 and extends through a suitable opening in the valve cage cover 7 into valve chamber D, where it engages the ball valve 3 to determine the lift thereof. The adjustable stop 9 is secured in the desired position by a cap nut 10 threaded thereon.

Leakage between the adjustable stop 9 and the valve plug 1 is prevented by providing the cap nut 10 and valve plug 1 with contacting surfaces of slightly different angles so as to provide a metal to metal joint on a line contact between the members. In a similar manner leakage between the valve plug 1 and the valve chest A is prevented by providing a shoulder 11 on the valve chest A within valve chamber D and an annular projection 12 on the valve plug 1, the juxtaposed faces of the shoulder 11 and the projection 12 being at slightly different angles. A joint of this type has been found to be very advantageous in its ability to withstand exceedingly high pressures, thus obviating the necessity for the use of the ordinary and troublesome gasket type joint.

While the invention is shown and described in connection with a valve of the ball type, it will be understood that it is equally applicable to wing or other types of valves and that various modifications may be made therein, within the invention as defined by the claims.

What I claim is:

1. The combination with a valve chest and a valve plug closure therefor, of a valve seat driven into the valve chest, a ball valve co-operating therewith, a valve cage bearing on the valve seat and guiding the movements of the ball valve, a cover bearing on the valve cage, a spring between the valve cage cover and the valve plug closure for holding the valve seat, cage and cover in contact, and means for regulating the lift of the valve from outside the valve chest.

2. The combination with a valve chest and a valve plug closure therefor, of a valve seat driven into the valve chest, a valve co-operating therewith, a valve cage bearing on the valve seat and guiding the valve, a cover bearing on the valve cage, a spring between the valve cage cover and the valve plug closure, and means for regulating the lift of the valve from outside the valve chest comprising an adjustable stop threaded through the valve plug closure and extending through the valve cage cover into the valve cage, and a cap nut on the adjustable stop for locking the stop in adjusted position.

3. The combination with a valve chest and a valve plug closure therefor, of a valve seat driven into the valve chest, a valve co-operating therewith, a valve cage bearing on the valve seat and guiding the valve, a cover on the valve cage, a spring between the valve cage cover and the valve plug closure, and means for regulating the lift of the valve from outside the valve chest comprising an adjustable stop threaded through the valve plug closure and extending through the valve cage cover into the valve cage, and a cap nut on the adjustable stop for locking the stop in adjusted position, said valve plug closure forming line to line metal contact with the cap nut and the valve chest to seal the joints without packing.

4. The combination with a valve chest, of a valve plug closure for the valve chest, a stop threaded through the valve plug closure for regulating the lift of the valve from outside the valve chest, and a cap nut on the adjustable stop for locking the stop in adjusted position, said valve plug closure forming a line-to-line metal contact with the cap nut and the valve chest to seal the joints without packing.

In testimony whereof, I have hereunto set my hand.

WILLS M. FLEMING.